United States Patent [19]

Huyer

[11] Patent Number: 4,928,547
[45] Date of Patent: May 29, 1990

[54] CRANK DEVICE

[75] Inventor: Johannes N. Huyer, Velserbroek, Netherlands

[73] Assignee: Vermeulen-Hollandia Octrooien II B.V., Netherlands

[21] Appl. No.: 258,390

[22] Filed: Oct. 17, 1988

[30] Foreign Application Priority Data

Oct. 19, 1987 [NL] Netherlands .................. 8702494

[51] Int. Cl.⁵ .............................................. G05G 1/00
[52] U.S. Cl. ..................................... 74/545; 74/501.6; 74/547; 296/223
[58] Field of Search ................ 74/501.6, 545, 547, 74/546, 548; 49/279, 449; 296/223

[56] References Cited

U.S. PATENT DOCUMENTS

| | | | |
|---|---|---|---|
| 3,148,913 | 9/1964 | Golde | 296/223 |
| 3,948,119 | 4/1976 | Schlapp | 296/223 |
| 3,976,325 | 8/1976 | Schätzler | 296/223 |
| 4,466,658 | 8/1984 | Fürst | 74/547 |
| 4,614,009 | 9/1986 | Boots | 74/528 |
| 4,615,236 | 10/1986 | Boots | 74/545 |
| 4,651,594 | 3/1987 | Vogel | 296/223 |
| 4,659,140 | 4/1987 | Fuerst | 296/223 |

FOREIGN PATENT DOCUMENTS

| | | | |
|---|---|---|---|
| 256049 | 10/1910 | Fed. Rep. of Germany | 74/528 |
| 3708635 | 9/1987 | Fed. Rep. of Germany | 296/223 |

Primary Examiner—Alexander Grosz
Assistant Examiner—F. Saether
Attorney, Agent, or Firm—Kinney & Lange

[57] ABSTRACT

A crank device for driving a panel of an open roof construction comprises a drive pinion (2) and a crank arm (9). Between the drive pinion (2) and the crank arm (9) there is provided an uncoupling device (46–53; 61–66) for uncoupling the crank arm (9) with respect to the drive pinion (2) such that the crank arm (9) is rotatable about the axis of the drive pinion (2) without rotating the drive pinion (2). Furthermore the crank comprises a locking members (20, 21, 22) for automatically locking the drive pinion (2) in the closed position of the panel. The crank device also comprises an indicator (22) indicating the position of the panel.

20 Claims, 3 Drawing Sheets

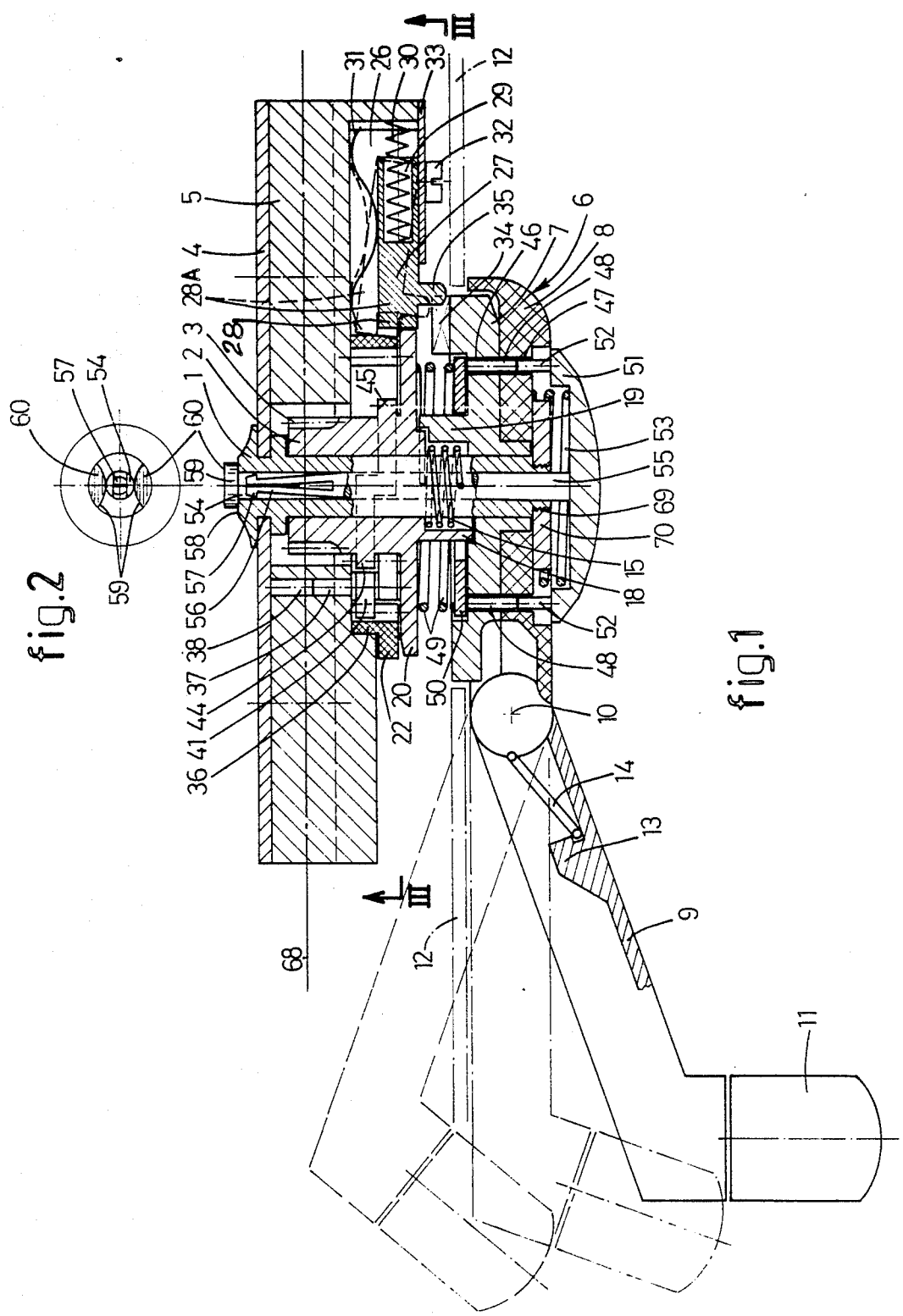

CRANK DEVICE

The invention relates to a crank device for driving a movable member of a vehicle, such as a panel of an open roof construction. More particularly, the invention relates to a crank device comprising a stationary part, a drive pinion operatively connected to the movable member and rotatably supported by the stationary part, and a crank arm connected to the drive pinion during said driving operation.

Such crank devices are known in various embodiments with open roof constructions for automobiles. Since the crank devices have to be operated fully manually by means of the crank arm, these crank devices require more attention of the driver of the vehicle compared to electrically operated open roof constructions. Furthermore, the crank arm gives additional problems, because it protrudes from the roof lining at least in the operative position and could therefore cause a risk of injuries if no special measurements would have been taken.

The present invention has as its first object to provide a crack device of the type mentioned in the preamble, which, for the operation thereof, requires only little attention of the driver of the vehicle and offers the comfort and safety of an electrically driven open roof construction.

A further object of the present invention is to provide a crank device comprising a very accurately operating locking means, the locking of which can be released in a simple way.

Still another object of the invention is to provide a crank device provided with an uncoupling means for uncoupling the crankarm with respect to the drive pinion, which is operable in a simple way and effects an automatic recoupling.

Further, it is an object of the invention to provide a crank device provided with an indication means, the position of which is determining for the position of the movable member.

For these purposes, a first embodiment of the crank device according to the invention is characterized by a locking means co-operating with the drive pinion and the stationary part to lock the crank device in a predetermined position of the movable member, and provided with means for releasing the locking of the crank device by the locking means; a braking means effective between the drive pinion and the stationary part to permit a rotation of the drive pinion through the crank arm and to prevent a rotation of the drive pinion by the movable part.

The locking means permits the movable member to be placed automatically in a desired predetermined position without the necessity of the driver to divert the driver's attention from the traffic. The breaking means prevents a displacement of the movable member by means of forces exerted on the movable member caused for instance by the driving wind or with breaking-in. The uncoupling means allows the crank arm to be uncoupled from the drive pinion in all positions of the movable member and to be moved to a stowed resting position without displacing the movable member.

In an embodiment of the crank device wherein the braking means operates with a free travel backlash or free movement between the crank arm and the drive pinion, this free travel back-lash can be utilized to release the locking of the drive pinion with respect to the stationary part. In this way, it is sufficiently for realising the locking of the drive pinion to rotate the crank arm back.

A further embodiment of the crank device according to the invention is characterized by stop means having a stop member and rotating with the drive pinions in a fixed relationship, the stop means comprising two co-operating rotatable elements, of which a stop element is provided with the stop member and a retaining element being provided with a releasing member; a locking member automatically coming into engagement with the stop member of the stop element in a predetermined position of the movable member in order to lock the driving of the movable member in the predetermined position; means for releasing the locking, wherein the stop element and the retaining element have mutually different transmission ratios to the drive pinion, chosen such that the releasing member on the retaining element permits an engagement between the locking member and the stop member only in a mutual rotational position of both elements corresponding to the predetermined position of the movable member.

In this way it is possible to effectuate a very accurate locking of the drive pinion and consequently of the panel which is free from play since locking takes place at a rotating stop member of which the transmission ratio with respect to the drive pinion can be chosen to any extent. The locking of the drive pinion will be more accurate if the rotational speed with which the stop member rotates with the drive pinion is increased.

Preferably, the stop member is connected directly to the drive pinion, so that the stop member rotates with the same rotational speed as the drive pinion.

This can be realized in a simple way if the stop member is integrally formed with the drive pinion and is constructed as a stop disc disposed concentrically about the axis of the drive pinion, a recess being formed in the periphery of the stop disc, the recess serving as a stop element and the locking member being able to engage into said recess.

Herein, it is possible that the retaining element consists of a retaining ring arranged concentrically about the axis of the drive pinion and being in engagement with the drive pinion through a reduction transmission, a resilient element acting upon the locking member in radial direction of the drive pinion and keeping the locking member in contact with the periphery of the retaining ring, the releasing member consisting of a recess provided in the periphery of the retaining ring and being alinged with the recess in the stop disc in the predetermined position of the movable member such that the locking member can engage in the recess in the stop disc.

These measurements cause the retaining element to prevent the locking member from coming into engagement with the stop member in other positions than the predetermined position of the movable member. Only in the predetermined position of the movable memer, both recesses in the stop disc and the retaining ring co-operate such that the locking member is able to enter the recess of the stop disc.

A further embodiment of the crank device according to the invention is characterized by an uncoupling means provided between the drive pinion and the crank arm to uncouple the crank arm with respect to the drive pinion such that the crank arm can be rotated about the axis of the drive pinion without rotating the drive pinion, wherein the uncoupling means is provided with a coupling member adapted to be manually displaced from a coupling position to an uncoupling position, and the coupling member being permitted to return automatically to the coupling position after rotating the crank arm to a predetermined position and bringing the crank arm back to the position in which it was uncoupled.

Said uncoupling means for the crank device has the advantage that first of all a very simple uncoupling of the crank arm with respect to the drive pinion takes place, while furthermore the crank arm has always a reproducable relation with respect to the drive pinion in its coupled position.

Herein it is advantageously when the drive pinion is provided with a hub consisting of two-axial rotatable hub parts, the first hub part being connected to the drive pinion and the crank arm being mounted to the second hub part, the coupling member being arranged to the first and second hub parts and coupling both hub parts in a nonrotatable relationship in its coupling position and uncouple both hub parts with respect to each other in its uncoupling position.

Herewith, it is possible that the coupling member comprises at least one coupling pin being slidable in axial holes formed in both hub parts and being loaded in a direction to its coupling position by a spring element.

In case the crank arm is pivoted about a shaft perpendicular to the axis of the drive pinion between a working position and a collapsed resting position, it is as an alternative possible that the coupling member consists of a coupling cam mounted to an actuating rotary knob being rotatable about said shaft between the coupling position and the uncoupling position, wherein the coupling cam engages in the recess in the first hub part in the coupling position of the actuating rotary knob and is brought out of engagement with the first hub part in the uncoupling position of the actuating rotary knob.

A further embodiment of the crank device according to the invention is characterized by a rotating ring disposed concentrically about a shaft of the drive pinion and serving as an indicating means for the position of the movable member; a reduction transmission provided between the drive pinion and the rotating ring and constructed as a toothed wheel disposed between the drive pinion and the rotating ring, wherein the rotating ring comprises a continuous internal gear being constantly in engagement with the wheel, the drive pinion being provided with a small number of teeth coming intermittently in engagement with the toothed wheel such that a continuous rotation of the drive pinion is converted by the reduction transmission into a reduced discontinuous rotation of the rotating ring.

Said rotating ring can, at first, be used as retaining ring of the locking means, and it forms also an indicating means for the position of the movable member, in case the reduction transmission is such that the rotating ring rotates less than one full rotation when the movable member is displaced between its extreme positions.

The invention will hereinafter be elucidated with reference to the drawing, which shows several embodiments of the crank device according to the invention for driving a movable member of a vehicle.

FIG. 1 is a transverse section of a crank device according to the invention for driving the panel of an open roof construction.

FIG. 2 is a partial plan view of the crank device of FIG. 1.

Figure 3:
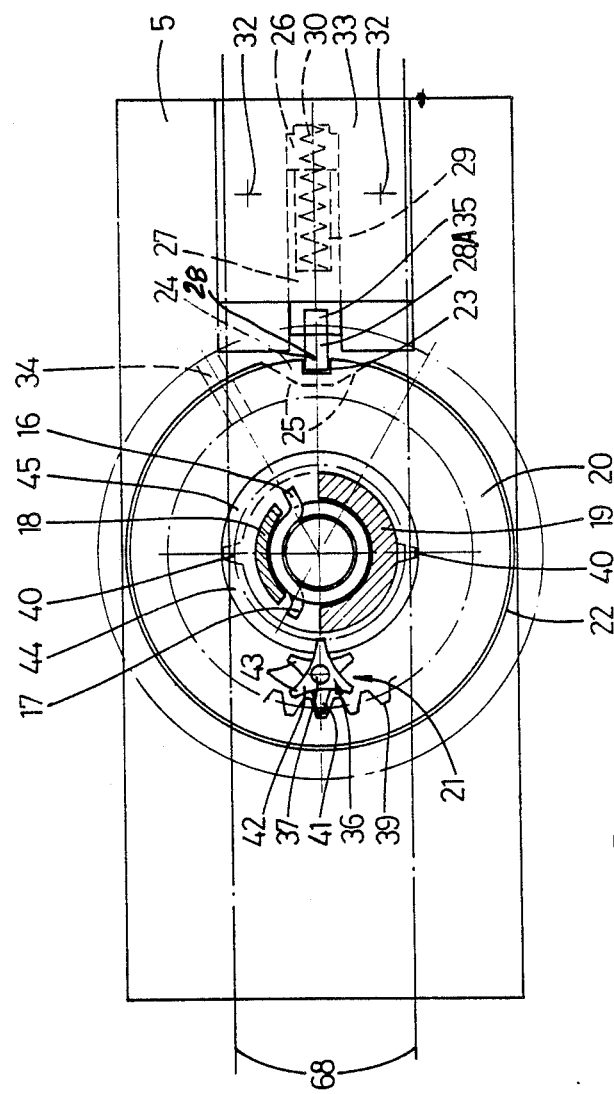
FIG. 3 is a section of along the line III—III in FIG. 1.

FIG. 1 shows a crank device for driving a panel (not shown) of an open roof construction, in particularly a panel of a tilt-sliding roof for an automobile. The panel of the tilt-sliding roof is adapted to be displaced by means of the crank device between a closed position and a backwardly slit position below the fixed roof of the automobile on one side and between the closed position and an backwardly and upwardly inclined venting position on the other side. For this purpose the crank device has a driven pinion rotatably supported on a stationary hollow vertical shaft 1 and provided on its upper side with gear teeth 3 is engagement with pull-push cables 68 (illustrated by a dash and dot line) comprising circumferential ribs and converting the rotation of the drive pinion 2 into a sliding movement of an actuating element for the panel. The stationary vertical shaft 1 is fixed to a horizontal plate means 4 also carrying a housing means 5. The plate means 4 and the housing means 5 together may be mounted to the frame of the tilt-sliding roof by means of screws or the like. In a way to be described hereinafter, the drive pinion 2 is connected to a hub 6 on its end facing away from the gear teeth 3, the hub 6 including two co-axial hub parts 7 and 8, of which the first hub part 7 being rotatably mounted on the vertical shaft 1 and being in engagement with the drive pinion 2, and the second hub part 8 being rotatably mounted on the first hub part 7. A mounting plate 70 connected to the stationary shaft 1 by means of a threaded connection 69 confines the hub part 7 and 8 radially.

A crank arm 9 is pivotally connected to the second hub part 8 at its one end by means of a horizontal shaft 10. At the end of the crank arm facing away from the hub 6 the crank arm 9 is provided with a knob 11 to grip the crank arm 9 by hand. The crank arm 9 has two stable positions: an operative position illustrated by uninterrupted lines, in which the crank device can be operated by means of the crank arm, and a resting position illustrated by dashed lines, in which the crank arm 9 is stowed away in a recess (not shown) in a roof lining 12 illustrated by dash and dot lines. The crank arm 9 is arrested in said stable positions by a spring 14 clamped in between the hub part 8 and a cam 13 on the crank arm 9, the torque of the spring 14 about the shaft 10 changing between the operative position and the resting position of the crank arm 9. In an unstable central position indicated by dash and dot lines the crank arm 9 extends parallel to the roof lining 12.

The crank device comprises a braking means preventing a rotation of the drive pinion 2 through the panel. For this purpose, a torsion spring 15 is mounted around the stationary vertical shaft 1 and frictionally engages this shaft, said torsion spring comprising a plurality of windings and two projecting ends 16 and 17. In the rest position of the torsion spring 15, in which no forces are exerted on its projecting ends, the frictional force between the torsion spring 15 and the stationary shaft 1 is so strong that no rotation of the torsion spring 15 with respect to the stationary shaft 1 can take place. The drive pinion 2 and the hub part 7 of the hub 6 are provided with co-operating arc-shaped wall portions 18 and 1 respectively, which can engage the projecting spring ends 16, 17 or each other. The wall portions 18 and 19 extend such a circular arc that a free movement of approximately 60° between a drive pinion 2 and the hub part 7 is permitted. When the hub part 7 is rotated by the crank arm 9, the wall portion 19 thereof engages a spring ends 16 or 17 respectively, whereupon the torsion spring 15 is deformed to such extent that the friction between said spring and the stationary shaft 1 becomes smaller. Hereafter, a rotation of the torsion spring 15 about the shaft 1 is possible, whereupon at the end of the free movement between the wall portions 18 and 19 the wall portion 19 at the hub part 7 can come into engagement with the wall portion 18 of the drive pinion 2, so that upon a further rotation of the hub part 7 a rotation of the drive pinion 2 is effected. However, if a torque is exerted on the drive pinion 2 by the panel through the pull/push cables 68, the wall portion 19 of the drive pinion 2 comes into engagement with the end 16 or 17 respectively of the torsion spring 15 and loads this torsion spring in such a way, that the friction between the torsion spring 15 and the stationary shaft 1 is still increased. In this manner a further rotation of the drive pinion 2 by the panel is prevented.

The crank device further comprises a locking means locking the drive pinion 2 in predetermined positions of the panel, in this case the closed position of the panel between the backwardly slit position and the upwardly tilted position of the panel. The purpose of the locking means is to lock the drive pinion automatically in the closed position of the panel when the panel is moved from one of the opened positions to the closed position, so that the panel is always closed automatically in the right position. By releasing the locking of the drive pinion 2 in the closed position of the panel, this panel is allowed again to be moved to an open position by means of the crank device.

The locking means comprises a stop disc 20 formed integrally with the drive pinion 2 and disposed co-axially therewith, as well as a co-axial retaining ring 22 rotatably connected with the drive pinion by means of a reduction transmission 21 to be described hereinafter. The transmission ratio of the reduction transmission 21 between retaining ring 22 and the drive pinion 2 is chosen such that an adjustment of the panel from the extreme upwardly tilted position to the extreme backwardly slit position corresponds to a rotation of the retaining ring 22 along an angle of slightly less than 360°. Consequently, the rotational position of the retaining ring 22 gives an indication about the position of the panel, since every position of the retaining ring 22 corresponds to a small range of positions of the panel, and in combination with the stop disc 20 an exact relationship between the position of the panel and that of the retaining ring 22/stop disc 20 is present. In the periphery of the stop disc 20 a right angled recess 23 is formed serving as stop member, and in the periphery of the retaining ring 22 a recess 24 working as a releasing member is provided, said recess 24 extending in radial direction slightly further in inwardly direction than said recess 23 and comprises diverging side walls 25 extending to the periphery of the retaining ring 22. The diameter of the retaining ring 22 is in fact slightly larger than that of the stop disc 20.

In the housing means 5 a rectangular cavity 26 is formed extending radially with respect to the drive pinion 2 and receiving a rectangular locking pin 27. At the end of the locking pin 27 facing the drive pinion 2 a smaller locking cam 28A is provided having a width permitting the nose 28 to enter the recess in the stop disc 20 and to lock the drive pinion 2 in this manner. The locking pin 27 has a depression 29 opening at the end of the locking pin 27 facing away from the drive pinion 2 and receiving a helical spring 30 partially, the helical spring 30 resting against the back wall of the cavity 26 and thereby loading the locking pin 27 in the direction to the retaining ring 22 and the stop disc 20 of the drive pinion 2.

The locking pin 27 is received in the cavity 26 with play in the axial direction to the drive pinion 2, such that the locking pin 27 can be urged against the force of a leaf spring 31 in a direction facing away from the hub 6. A covering plate 33 mounted to the housing means 5 by screws 32 closes the cavity 26 at the lower side.

The hub part 7 of the hub 6 is provided with a rib 34 on its side facing the drive pinion 2, the rib 34 being able to co-operate with a cam 35 formed on the locking pin 27 on the side thereof facing the hub part 7. Through the cooperation of the rib 34 at the hub part 7 and the cam 35 on the locking pin 27 the end of the locking pin 27 facing the drive pinion 2 is pushed in axial direction away from the hub part 7.

The operation of the locking means of the crank device is as follows.

In any open position of the panel of the tilt-sliding roof the retaining ring 22 of the locking means is rotated such, that the recess 24 thereof is spaced from the locking pin 27. The locking pin 27 is resting with its locking nose 28 against the outer periphery of the retaining ring 22. The locking nose 28 is dimensioned in axial direction of the drive pinion 2 such that is also extends along the height of the stop disc 20 in its initial position. When the drive pinion 2 is rotated by means of the crank arm 9 such that the panel is moved to its closed position, the retaining ring 22 is rotated to a reduced extent through the reduction transmission 21, wherein the recess 24 is displaced in the direction to the locking pin 27.

On the contrary, the stop disc 20 rotates with the same rotational speed as the drive pinion 2, so that with each rotation of the drive pinion 2 the recess 23 passes the locking pin 27. However, since the locking nose 28 of the locking pin 27 rests against the periphery of the retaining ring 22, of which the diameter is slightly larger than that of the stop disc 20, the locking pin 27 remains in its initial position each time it passes the recess 23 in the stop disc 20.

However, in the closed position of the panel the retaining ring 22 is rotated to such an extent that the recess 24 therein is aligned with the locking cam 28A of the locking pin 27. Consequently, the locking nose 28 of the locking pin 27 comes to rest against the periphery of the stop disc 20. When in this situation the recess 23 of the stop disc 20 is caused to be aligned with the locking pin 27 as well, so that both recesses 23 and 24 coincide, the locking nose 28 of the locking pin 27 will be urged into the recess 23 of the stop disc 20 by means of the helical spring 30 and the stop disc 20 and consequently the drive pinion 2 will be locked against a further rotation. In this way the panel is automatically locked exactly in its closed position without the driver's attention being diverted from the traffic.

If the driver wishes to open the panel of the tilt-sliding roof again back to the same opened position or further to another opened position, he should first turn the hub 6 back along its free stroke with respect to the drive pinion 2 by means of the crank arm 9. By rotating the hub 6 back along the free stroke the rib 34 on the hub part 7 will contact the cam 35 of the locking pin 27 lying in the path of the rib 34 in the locking position of the locking pin 27 (the cam 35 lies outwardly of the path of the rib 34 in the initial position of the locking pin 27). Consequently, the cam 35 and therefore the end of the locking pin 27 facing the stop disc 20 is urged against the force of the leaf spring 21 in axial direction away from the hub part 7 to such an extent that the locking nose 28 of the locking pin 27 is urged in axial direction out of the recess 23 of the stop disc 20. Because the helical spring 30 also exerts a radial force on the locking pin 27, this locking pin 27 is urged radially inwardly after the locking nose 28 has left the recess 23 in the stop disc 20 until the locking nose 28 is stopped by the wall of the recess 24 in the retaining ring 22. This intermediate position of the locking pin 27 is indicated with dashed lines in FIG. 1. In this intermediate position the locking pin 27 is loaded by the bent leaf spring 31 against the side of the stop disc 20 facing away from the hub 6.

Because in the intermediate position of the locking pin 27 the locking nose 28 is not anymore in engagement with the recess 23 in the stop disc 20 the locking action of the stop disc 20 and thereby of the drive pinion 2 is released. Thus, the drive pinion 2 is allowed to be rotated by the hub 6 in both directions. By the rotation of the drive pinion 2 the retaining ring 22 is also rotated to a reduced extent through the reduction transmission 21. Herein, one of the inclined side walls 25 of the recess 24 in the retaining ring 22 is brought into engagement with the locking nose 28 of the locking pin 27, so that the locking pin 27 is urged radially outwardly by the inclined side wall 25. Because the diameter of the retaining ring 22 is slightly larger than that of the stop disc 20 the locking nose 28 will be displaced outwardly to such an extent that the locking nose 28 will be brought out of engagement with the side of the stop disc 20 facing away from the hub 6. Consequently, the locking pin 27 is urged back in axial direction to its initial position by the bent leaf spring 31, wherein the locking nose 28 rests against the periphery of the retaining ring 22 and also extends along the height of the stop disc 20, so that the locking pin 27 is allowed to lock the stop disc 20 when the panel reaches the closed position.

The structure of the reduction transmission 21 mentioned hereinbefore appears from FIG. 1 and 3. Herein, it can be seen that the reduction transmission 21 comprises a toothed wheel 36 arranged radially between the drive pinion 2 and the surrounding retaining ring 22. This toothed wheel 36 has a pivot pin 37 extending parallel to the axis of the drive pinion 2 and being journalled in a hole 38 in the housing means 5. The retaining ring 22 being provided with a internal teeth 39 completely around its inner periphery. The teeth 39 extend along the full height of the toothed wheel 36 and are constantly in engagement with the toothed wheel 36. On the contrary, the drive pinion 2 is provided at its outer periphery with only two teeth 40 with an angular spacing of 180°. When the drive pinion 2 is rotated these teeth 40 come intermittently in engagement with the toothed wheel 36 such that a continuous rotation of the drive pinion 2 is converted by the reduction transmission 21 into an intermittent rotation of the retaining ring 22.

The toothed wheel 36 consists of two axially separated non-rotatingly connected toothed wheel parts 41 and 42 each having the same number of teeth 43, as shown, 3. The teeth 43 of both toothed wheel parts 41, 42 are off-set a half circular pitch with respect to each other and the teeth 43 are arranged in such a way, that the teeth 43 of both toothed wheel parts 41 and 42 together form a mating gear for teeth 39 such that successively a tooth 43 of the one toothed wheel part 41 and then a tooth 43 of the other toothed wheel part 42 comes into engagement with adjacent teeth 39 of the retaining ring 22.

Between the teeth 40 of the drive pinion 2 a collar 44, 45 respectively extend in the circumferential direction of the drive pinion 2, the collars each having a radius substantially equal to the distance between the axis of the drive pinion 2 and the top of the teeth 40 thereof. Said collar 44 at one half of the drive pinion 2 extends only along the height of the one toothed wheel part 41, the collar 45 at the other half of the drive pinion 2 only extending along the height of the other toothed wheel part 42. The collars 44, 45 thereby prevents a rotation of the toothed wheel 36 and consequently of the retaining ring 22 except for a rotation thereof by the drive pinion 2.

The operation of the reduction transmission 21 is as follows.

In the position, illustrated in FIG. 3, a tooth 43 of the toothed wheel part 41 is in engagement with the teeth 39 of the retaining ring 22. The opposite tooth 43 of the other tooted wheel part 42 extends up to the path of the teeth 40 of the drive pinion 2. This tooth 43 of the toothed wheel part 42 of the toothed wheel 36 also extends beyond the outer periphery of the collar 44 of the drive pinion 2, the collar 44 extending at the height of the other toothed wheel part 41. If the toothed wheel 36 would be rotated by the toothing 39 of the retaining ring 22, one of the teeth 43 of the toothed wheel part 41 will contact the collar 44 thereby preventing a further rotation of the toothed wheel 36.

When the drive pinion 2 is rotated, one of the teeth 40 thereof comes into engagement with the tooth 43 of the toothed wheel part 42, whereby the toothed wheel 36 is rotated along by one circular pitch. Consequently a tooth 43 of the toothed wheel part 41 of the toothed wheel 36 comes to lie in the path of the teeth 40 of the drive pinion 2. This is possible because the collar 45 of the drive pinion 2 on the other side of the respective tooth 40 only extends at the height of the toothed wheel part 42, and the collar 45, therefore, prevents a rotation of the toothed wheel 36 through the toothed wheel part 42 in this half of the drive pinion 2. In the manner described, during a rotation of 360° of the drive pinion 2, a rotation of the retaining ring 22 takes place about an angle which is considerably smaller, so that a discontinuous motion of the retaining ring 22 is effected, which is reduced with respect to the motion of the drive pinion 2.

The crank device is further provided with an uncoupling means for uncoupling the crank arm 9 with respect to the drive pinion, 2 so that the crank arm 9 is allowed to rotate about the axis of the drive pinion 2 without rotating this drive pinion 2. The purpose thereof is to be able to uncouple the crank arm 9 in every position of the drive pinion 2 and consequently every position of the panel of the tilt-sliding roof and to rotate the crank arm 9 to its resting position in a recess in the roof lining without changing the position of the panel.

In the embodiment of the crank device as shown in the drawings, the uncoupling of the crank arm 9 with respect to the drive pinion 2 takes place between the hub parts 7 and 8 of the hub 6. For this purpose, both hub parts have a plurality of axial holes 46, 47 respectively spaced about their axes, the holes 46 and 47 being allowed with each other in the coupling position of both hub parts 7 and 8. In each hole 46 a coupling pin 48 serving a coupling member is slidably arranged. These coupling pins 48 have a longer length then the width of the hub part 7 at the position of this hole 46. Each coupling pin 48 is loaded by a helical spring 49 at its end facing away from the hub part 8, the helical spring 49 acting upon the coupling pins 48 through a flat ring 50 and loading the coupling pins 48 in the direction to the hub part 8 if the coupling pins 48 protrude from the hub part 7 on the side thereof facing away from the hub part 8. In the coupling position of the uncoupling means, the coupling pins 48 extent both through the holes 46 in the hub part 7 and into the holes 47 in the hub part 8, so that both hub parts 7 and 8 are non-rotatably connected with each other.

The uncoupling means is further provided with an actuating means for the coupling pins 48 consisting of an actuating knob 51 being axially slidably mounted to the hub part 8 and comprising a plurality of actuating pins 52 slidably received in the holes 47 for the coupling pins 48. A helical spring 53 arranged between the hub part 8 and the actuating knob 51 loads the actuating knob 51 in the direction to its coupling position in which the actuating pins 52 only partially protrude into their respective holes 47 in the hub part 8. In contrast thereto, the actuating pins 52 extend precisely along the whole length of their respective holes 47 in the hub part 8 in the uncoupling position of the actuating knob 51.

The actuating knob 51 further comprises a latching member latching the actuating knob 51 in its uncoupling position. This latching member consists of an axially extending peg 55 protruding into a cavity of the vertical stationary shaft 1 and being fixed to the actuating knob 51 at its lower end. At the other end the peg 55 is provided with two outwardly springing legs 56 and the free end of each leg being formed a latching nose 57. In the uncoupling position of the actuating knob 51, the latching noses 57 protrude from the cavity 54 in the stationary shaft 1 and engaging the end face 59 at the respective end of the stationary shaft 1, so that the actuating knob 51 is latched in this uncoupling position. On the end face 58 at the end of the stationary shaft 1 axial faces 59 are provided on fixed pieces 60, the faces 59, which serve as releasing means, being formed on both sides of the cavity 54 in the stationary shaft 1 and extend up to the circumference thereof. In circumferential direction of the stationary shaft 1, the faces 59 of the fixed pieces 60 are positioned such that in the position of the hub part 8, in which the crank arm is below the recess in the roof lining 12, the latching noses 57 are urged inwardly by the engagement with the faces 59 of the fixed pieces 60 to such an extent that the engagement between the latching noses 57 and the end face 59 of the stationary shaft 1 is released and the peg 55 of the actuating knob 51 is allowed to be displaced to the coupling position by the helical spring 53.

The operation of the uncoupling means of FIG. 1 is as follows.

By means of the crank arm 9, which is in its operative position, the drive pinion 2 is rotated and the panel of the tilt-sliding roof is moved to a desired position. When the desired position is reached, it is desirable that the crank arm 9 is stowed away in the recess in the roof lining 12, since in this stowed away resting position of the crank arm 9 there is a smaller risk of injuries of the passengers by the crank arm 9 in case of an accident. In most cases, the crank arm 9 will not be positioned precisely under the recess in the roof lining 12 when the panel is in its desired position, so that the crank arm has to be rotated about the axis of the drive pinion 2 to the right position under the recess in the roof lining 12, during which the position of the panel of the tilt-sliding roof should not be changed. For this purpose, the actuating knob 51 is depressed to its uncoupling position. The engagement between the latching noses 57 and the end face 59 of the stationary shaft 1 causes the actuating knob 51 to be latched in this uncoupling position. In the uncoupling position of the actuating knob 51, the coupling pins 59 are displaced by the actuating pins 52 on the actuating knob 51 against the force of the helical spring 59 to such an extent, that the coupling pins 48 are just pushed out of the holes 47 in the hub part 8. Hereby, the non-rotating coupling between both hub parts 7 and 8 is released, so that the hub part 8 is allowed to be rotated about the axis of the drive pinion 2 by the crank arm 9, during which the hub part 7 and consequently the drive pinion 2 and the panel of the tilt-sliding roof remain in their position. If the crank arm 9 is rotated to a position under the recess in the roof lining 12, the latching noses 57 are urged inwardly by the faces 59 on the fixed pieces 60 are just to such an extent that the engagement between the latching noses 57 and the end face 58 of the stationary shaft 1 and consequently the latching of the actuating knob 51 is released, whereby the actuating knob 51 is displaced by the helical spring 53 to its uncoupling position. This action is accompanied with a warning or click which can be heard clearly, so that the driver of the vehicle understands that the crank arm 9 has arrived in the right position under the recess in the roof lining 12, without the necessity to divert his attention from the traffic. When the actuating knob 51 and thereby the actuating pins 52 are moved to their uncoupling position, the coupling pins 48 will be maintained in their uncoupling position, since the holes 47 in the hub part 8 and the holes 46 in the hub part 7 are not aligned with each other so that the coupling pins 48 rest on the face of the hub part 8 facing the hub part 7. If the driver wishes to move the panel of the tilt-sliding roof again, the crank arm 9 first has to be moved from its resting position in the recess in the roof lining 12 to the operative position, and thereupon the crank arm 9 and the hub part 8 should be rotated about the axis of the drive pinion 2. When the hub part 8 is rotated such that it takes the position in which the hub part 8 was uncoupled from the hub part 7, the holes 47 of the hub part 8 will be aligned again with the holes 46 in the hub part 7. Hereby, the coupling pins 48 will be urged into the holes 47 of the hub part 8 by the helical spring 49 so that the non-rotating coupling between both hub parts 7 and 8 is effected again, and upon a further rotation of the hub part 8 the hub part 7 and the drive pinion 2 are rotated along the panel of the tilt-sliding roof will be moved.

Figure 4:
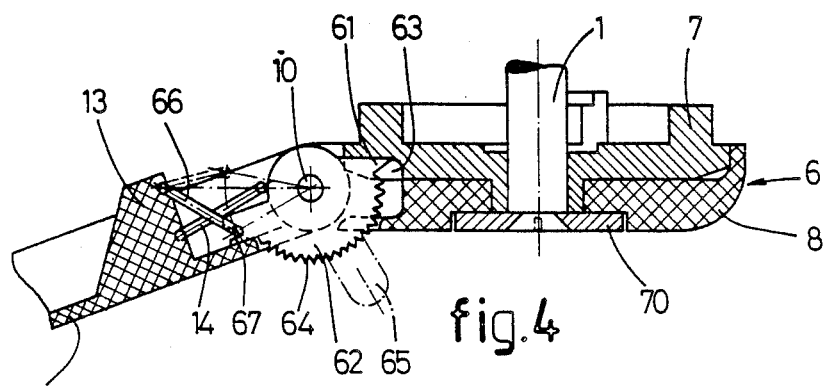
FIG. 4 is a section corresponding to that of FIG. 1 of a part of a modified embodiment of the crank device of FIG. 1.
Figure 5:
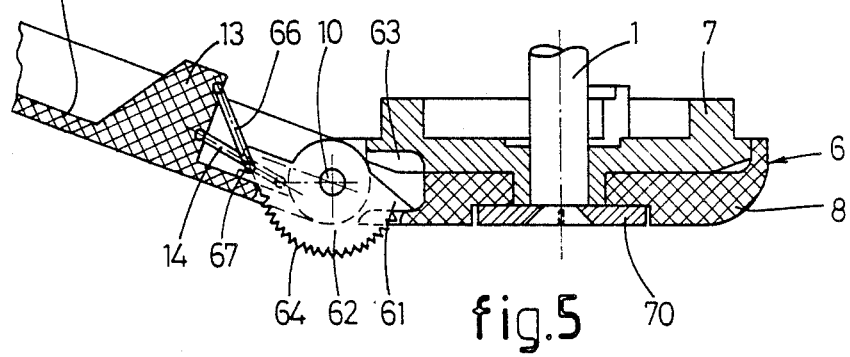
FIG. 5 is a section corresponding to that of FIG. 4 showing the crank device of FIG. 4, wherein, however, the crank arm is illustrated in another position.
Figure 6:
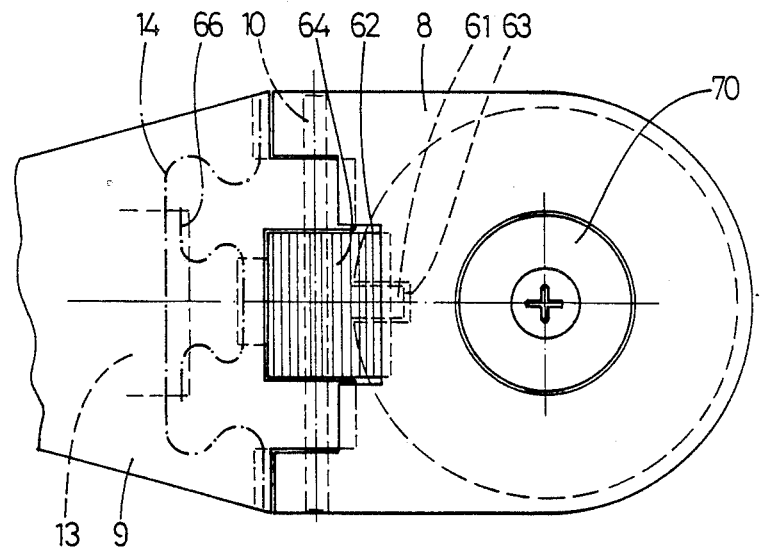
FIG. 6 is a bottom view of the crank device of FIG. 4.

FIG. 4–6 show an alternative embodiment of the uncoupling means of the crank device. Herein, the uncoupling of the crank arm 9 with respect to the drive pinion 2 takes place again by uncoupling the hub part with respect to the hub part 7. In this case, the coupling member consists of a coupling cam 61 formed on an actuating rotary knob 62 which is rotatable about the shaft 10 between the crank arm 9 and the hub part 8. In the coupling position of the actuating rotary knob 62, the coupling cam 61 thereof engages in a recess 63 in the hub part 7, and in the uncoupling position of the actuating rotary knob 62, the coupling cam 61 is moved out of engagement with the first hub part 7. The actuating rotary knob 62 is adapted to be rotated manually from the coupling position to the uncoupling position. For this purpose the actuating rotary knob has a knurled surface 64. Also, an alternative for the curved knurled surface 64 it is also possible to provide an actuating rib 65 illustrated by a dash and dot line.

Between the actuating rotary knob 62 and the crank arm 9 a substantially omega-shaped spring 66 is arranged, of which the central part is placed in a notch 67 of the actuating rotaty knob 62, and both legs of the spring 66 being supported in the cam of the crank arm 9. In the operative position of the crank arm 9 (FIG. 4) the spring 66 arrests the actuating rotary knob 62 both in the coupling position (spring 66 illustrated by uninterupted lines), and in the uncoupling position (spring 66 indicated by dash and dot lines) so that, when the actuating rotary knob 62 is manually rotated, it automatically looks for the coupling or uncoupling position respectively after an unstable central position. In the collapsed resting position of the crank arm, in which the actuating rotary knob 62 is in the uncoupling position, the spring 66 is pivoted with respect to the actuating rotary knob 62 such that this spring 66 loads the actuating rotary knob 62 in a direction to its coupling position.

The operation of the uncoupling means of FIGS. 4–6 is as follows.

In the operative position of the crank arm 9, the actuating rotary knob 62 can be rotated by a finger from the coupling position to an uncoupling position when the panel of the tilt-sliding roof has reached its desired position. The spring 66 exerts upon the actuating rotary knob 62 such a torque about the shaft 10 that the actuating rotary knob 62 is arrested in the uncoupling position. Because the coupling cam 61 is removed from the recess 63 in the hub part 7, the hub part 8 is permitted to be rotated about the axis of the vertical shaft 1 by means of the crank arm 9 without the hub part 7 being rotated. If the right position of the crank arm 9 under the recess in the roof lining is reached, the crank arm 9 is allowed to be pivoted from its operative position to the resting position in the recess of the roof lining. In this position the crank arm 9 is arrested by the spring 14. When the crank arm 9 is pivoted from the operative position to the resting position the spring 66 is pivoted with respect to the actuating rotary knob 62 such that the torque thereof on the actuating rotary knob is reversed and the actuating rotary knob 2 is consequently loaded by the spring 66 in a direction to its coupling position. As a result, when the crank arm 9 is pivoted back from the collapsed resting position to the protruding operative position the actuating rotary knob 62 will be automatically rotated back until the coupling cam 61 on the actuating rotary knob 62 contacts the lower side of the first hub part 7. When the crank arm 9 is rotated back together with the second hub part 8 to the position in which the uncoupling took place, the coupling cam 61 will be automatically urged into the recess in the hub part 7 by the spring 66 so that an automatic coupling between the second hub part 8 and the first hub part 7 and consequently between the crank arm 9 and the drive pinion 2 is effected. Hereupon, the panel of the tilt-sliding roof is permitted to be displaced to another position.

The invention is not restricted to the embodiments shown in the drawing by way of example, which can be varied in different ways within the scope of the invention. As an example it is possible to use the invention in other open roof constructions, such as spoiler roofs.

I claim:

1. Crank device for driving a movable member of a vehicle, such as a panel of an open roof construction, comprising:

a stationary part;

a drive pinion operatively connected to the movable member and rotatably supported by the stationary part;

a crank arm connected to the drive pinion during a driving operation wherein rotation of the crank rotates the pinion;

stop means rotating with the drive pinion in a known relationship, the stop means comprising two cooperating rotatable elements, comprising a stop element directly connected to the drive pinion and including a stop member, and a retaining element rotatably driven by rotation of the pinion and provided with a releasing member;

a locking member engageable with the stop member of the stop element in a predetermined position of the movable member in order to lock the movable member in the predetermined position;

means for releasing the locking member from the stop member; and a drive transmission between the retaining element and the drive pinion having a different transmission ratio of rotation relative to rotation of the drive pinion from the stop element, chosen such that the releasing member on the retaining element permits engagement between the locking member and the stop member only in a mutual aligned rotational position of both elements corresponding to the predetermined position of the movable member.

2. Crank device according to claim 1, wherein the stop element is integrally formed with the drive pinion and is constructed as a step disc disposed concentrically about the axis of the drive pinion, a recess being formed in the periphery of the stop disc and serving as the stop member, the locking member being engageable into the recess.

3. Crank device according to claim 2, wherein the retaining element consists of a retaining ring disposed concentrically about the axis of the drive pinion the drive transmission comprising a reduction transmission, a resilient element biasing the locking member in radial direction toward the drive pinion and keeping the locking member in contact with the periphery of the retaining ring, the releasing member consisting of a recess provided in the periphery of the retaining ring, said recess in the retaining ring being aligned with the recess in the stop disc in the predetermined position of the movable member such that an engaging portion of the locking member engages the recess in the stop disc.

4. Crank device according to claim 3, wherein the locking member has three positions comprising an initial position in which the locking member is in contact with the periphery of the retaining ring, a locking position in which the locking member is in engagement with the recess in the stop disc and an intermediate position in which the locking member is in engagement with the recess in the retaining ring.

5. Crank device according to claim 4, wherein the surfaces defining the recess in the retaining ring and the engaging portion of the locking member are constructed such that upon rotation of the retaining ring, while the locking member is in its intermediate position, the locking member is cammed back to its initial position by the retaining ring.

6. Crank device according to claim 5, wherein the recess in the retaining ring extends in radial direction further inwardly than the recess in the stop disc, the recess in the retaining ring having side walls diverging to the periphery of the retaining ring, and the locking member is loaded in axial direction of the drive pinion towards the stop disc by a resilient element.

7. Crank device according to claim 2, wherein the crank arm is mounted on a hub which is connected to the drive pinion through a connection that initially permits free rotational movement between the hub and the drive pinion, and wherein the stop disc is arranged axially between the hub and the retaining ring, the means for releasing the locking member including a cam formed on the side of the hub facing the stop disc, the cam being engageable with the locking member such that upon rotation of the hub during the free rotational movement of the crank and hub relative to the drive pinion, the cam displaces the locking member from its locking position to its intermediate position.

8. Crank device according to claim 1, wherein the locking member consists of a locking pin slidably received in a cavity in the stationary part and being permitted to move within the cavity in both axial and radial directions relative to the drive pinion, and resilient elements mounted in the cavity for biasing the locking pin in axial and radial directions.

9. Crank device according to claim 8, wherein the radial resilient element consists of a helical spring and the axial resilient element consists of a bent leaf spring.

10. Crank device according to claim 8, wherein the locking pin is provided with a locking nose at its end facing the stop disc, the locking nose being dimensioned in the axial direction to the drive pinion such that in the locking position of the locking pin the locking nose engages both the recess of the stop disc and the recess of the retaining ring, the locking pin being provided with a second cam at its end facing the hub, the second cam lying radially outwardly of the path of the cam on the hub in the initial position of the locking pin and lying in the path of the cam on the hub in the locking position of the locking pin.

11. Crank device for driving a movable member of a vehicle, such as a panel of an open roof construction, comprising:
a stationary part;
a drive pinion operatively connected to the movable member and rotatably supported by the stationary part;
a crank arm connected to the drive pinion during a driving operation wherein the crank is rotated to drive the pinion;
uncoupling means provided between the drive pinion and the crank arm to uncouple the crank arm with respect to the drive pinion such that the crank arm can be rotated about the axis of the drive pinion to a predetermined resting position without rotating the drive pinion;
wherein the uncoupling means is provided with a coupling member adapted to be manually displaced through an actuating member from a coupling position to an uncoupling position, and the coupling member has means permitting return to the coupling position only when the crank arm has been returned from its predetermined resting position to the angular position with respect to the drive pinion in which it was uncoupled so as to insure a predetermined operative rotational relationship between the crank arm and the drive pinion.

12. Crank device according to claim 11, wherein the drive pinion is provided with a hub consisting of two coaxial rotatable hub parts, the first hub part being connected to the drive pinion and the crank arm being mounted to the second hub part, the coupling member being arranged between the first and second hub parts and coupling both hub parts in a non-rotatable relationship in its coupling position and uncoupling both hub parts with respect to each other in its uncoupling position.

13. Crank device according to claim 12, wherein the coupling member comprises at least one coupling pin being slidable in axial holes formed in both hub parts and being loaded in a direction to a coupling position by a spring element.

14. Crank device according to claim 13, wherein there is provided an actuating member for the coupling pin consisting of an actuating knob axially connected to the second hub part, the actuating knob being provided with an actuating pin protruding into the hole for the coupling pin in the second hub part and, in the uncoupling position of the actuating knob, urging the coupling pin against the force of the resilient element out of the hole in the second hub part into the uncoupling position, wherein the actuating knob comprises a latching member latching the actuating knob in its uncoupling position, and the stationary part comprising a releasing member releasing the latching member and consequently the actuating knob in the predetermined desired position of the second hub part, and spring means urging the actuating knob in a direction to the coupling position to bring the actuating knob to the coupling position.

15. Crank device according to claim 14, wherein the latching member consists of an axial peg protruding into a hollow shaft of the stationary part, the peg being fixed to the actuating knob at one end and being provided with two outwardly spring legs at the other end, the spring legs each having a free end formed into a latching nose, said latching noses protruding out of the hollow shaft and engaging a face at the respective end of the hollow shaft in the uncoupling position of the actuating knob, and second faces being provided on the latching member adjacent the hollow shaft and serving as releasing members formed on both sides of the hollow shaft and extending up to the periphery of the hole in the hollow shaft, the second faces being disposed in the circumferential direction of the hollow shaft such that in the predetermined desired position of the second hub part the latching noses are urged inwardly by the engagement with the second faces of the latching member to such an extent that the peg and the actuating knob are able to be displaced to the coupling position by the spring member.

16. Crank device according to claim 12, wherein the crank arm is pivotable between an operative position and a collapsed resting position about a shaft perpendicular to the axis of the drive pinion, the coupling member consisting of a coupling cam being provided on an actuating rotary knob rotatable about said shaft between the coupling position and uncoupling position, wherein the coupling cam engages into a recess in the first hub part in the uncoupling position of the actuating rotary knob and is brought out of engagement with the first hub part in the uncoupling position of the actuating rotary knob.

17. Crank device according to claim 16, wherein a spring is arranged between the actuating rotary knob and the crank arm, said spring arresting the actuating rotary knob in the uncoupling or coupling position, respectively in the operative position of the crank arm and loading the actuating rotary knob in a direction to the coupling position when the crank arm is in the collapsed resting position in which the actuating rotary knob is in the uncoupling position.

18. Crank device according to claim 16, wherein an arresting spring is arranged between the crank arm and the second hub part, the arresting spring arresting the crank arm both in the operative position and the collapsed resting position.

19. Crank device for driving a movable member of a vehicle, such as a panel of an open roof construction, comprising:
 a stationary part;
 a drive pinion operatively connected to the movable member and rotatably supported by the stationary part:
 a rotary ring disposed concentrically about a shaft of the driving pinion and serving as an indicating means for the position of the movable member;
 a reduction transmission provided between the drive pinion and the rotating ring and constructed of a toothed wheel disposed between the drive pinion and the rotating ring, wherein the rotating ring comprises a full toothing being constantly in engagement with the toothed wheel, the drive pinion being provided with a small number of teeth coming intermittently in engagement with the toothed wheel such that a continuous rotation of the drive pinion is converted by the reduction transmission into a reduced discontinuous rotation of the rotating ring.

20. Crank device according to claim 19, wherein the toothed wheel comprises two axially separated non-rotatingly connected toothed wheel parts each having the same number of teeth, the teeth of both toothed wheel parts are offset a half circular pitch with respect to each other and together form a complete toothing such that successively a tooth of one toothed wheel part and a tooth of the other toothed wheel part is in engagement with the toothing of the rotating ring, between the teeth of the drive pinion successively a collar extending at the height of the one toothed wheel part and extending at the height of the other wheel part in the circumferential direction of the drive pinion being provided, the collar having a radius substantially equal to the distance between the axis of the drive pinion and the top of the teeth thereof and preventing a rotation of the toothed wheel and consequently of the rotating ring.

* * * * *

UNITED STATES PATENT AND TRADEMARK OFFICE
CERTIFICATE OF CORRECTION

PATENT NO. : 4,928,547
DATED : May 29, 1990
INVENTOR(S) : Johannes N. Huyer

It is certified that error appears in the above-identified patent and that said Letters Patent is hereby corrected as shown below:

Col. 12, line 46, delete "step", insert --stop--.

Col. 16, line 2, delete "driving", insert --drive--.

Signed and Sealed this

Eighth Day of October, 1991

Attest:

HARRY F. MANBECK, JR.

Attesting Officer

Commissioner of Patents and Trademarks